United States Patent [19]

Fumoto et al.

[11] 4,134,995
[45] Jan. 16, 1979

[54] MODIFIED TETRAFLUOROETHYLENE POLYMER AND PROCESS FOR PRODUCING SAME

[75] Inventors: Syozo Fumoto, Suita; Tetsuo Shimizu, Osaka; Shigeru Ichiba, Kyoto, all of Japan

[73] Assignee: Daikin Kogyo Kabushiki Kaisha, Osaka, Japan

[21] Appl. No.: 874,422

[22] Filed: Feb. 2, 1978

Related U.S. Application Data

[63] Continuation-in-part of Ser. No. 682,593, May 3, 1976, abandoned.

[51] Int. Cl.$^2$ .................... C08L 27/04; C08L 27/18
[52] U.S. Cl. .................... 260/884; 260/29.6 F; 526/249; 526/80
[58] Field of Search .................... 260/29.6 F, 884; 526/249, 80

[56] References Cited

U.S. PATENT DOCUMENTS

| 3,142,665 | 7/1964 | Cardinal et al. ............... 526/82 X |
| 3,654,210 | 4/1972 | Kuhls et al. ............... 260/29.6 F |
| 4,038,231 | 7/1977 | Downer et al. ............... 260/884X |

FOREIGN PATENT DOCUMENTS 1393509  5/1975  United Kingdom .................... 526/249

Primary Examiner—Carman J. Seccuro
Attorney, Agent, or Firm—Larson, Taylor and Hinds

[57] ABSTRACT

In a process for polymerization of tetrafluoroethylene with a copolymerizable modifier in an aqueous medium containing a polymerization initiator and a dispersant to produce a modified tetrafluoroethylene polymer containing 0.001 to 2 wt.% of the copolymerizable modifier based on the weight of the polymer, a process for producing the modified tetrafluoroethylene polymer characterized in that:

(1) chlorotrifluoroethylene is used as said copolymerizable modifier,
(2) at least 50 wt.% of the copolymerizable modifier to be incorporated into the polymer is introduced into the polymerization system after 70 wt.% of the polymer to be finally formed has been formed, and
(3) after 90 wt.% of the polymer to be finally formed has been formed, the concentration of said copolymerizable modifier is maintained at least 0.01 mol.% based on the total amount of tetrafluoroethylene and the modifier in the polymerization system.

2 Claims, No Drawings

MODIFIED TETRAFLUOROETHYLENE POLYMER AND PROCESS FOR PRODUCING SAME

This application is a continuation-in-part of our co-pending application Ser. No. 682,593 filed on May 3, 1976, now abandoned.

This invention relates to a modified high molecular weight tetrafluoroethylene polymer especially suitable for paste extrusion through nozzles with increased reduction ratio, and a process for producing the same.

Fine powder of tetrafluoroethylene polymer (hereinafter referred to as "TFE polymer") is produced by coagulating an aqueous dispersion of TFE polymer prepared by the emulsion polymerization of tetrafluoroethylene (hereinafter referred to as "TFE"). Fine powder of TFE polymer is admixed with liquid lubricants such as high boiling hydrocarbons having a carbon number of 9 to 12, and the resulting mixture is molded into slender rods or tubes by conventional paste extrusion through a nozzle, which is referred to as paste extrusion. The extrudate is calendered into a tape by calender rolls for use as an unsintered tape. When the extrudate is in the form of a tube, it is finally sintered to obtain a finished product.

With the paste extrusion method, it is required than the operation be carried out with the highest possible efficiency to achieve high productivity and that the molded product finally obtained by sintering the extrudate has high mechanical strength.

The productivity is dependent largely on the reduction ratio involved in the extruding operation, extrusion pressure and extrusion velocity. The reduction ratio is expressed by the ratio of the cross sectional area (S) of the cylinder into which the paste material is charged to the cross sectional area (s) of the nozzle of the extruder. It is desired that the reduction ratio (S/s) be high; at a high reduction ratio, a large quantity of TFE polymer paste can be charged into the extruder cylinder for each extrusion cycle. Further in practice, high reduction ratios are often invariably required, for example, for extruding an article of very small cross sectional area as when manufacturing an insulated electric wire coating by paste extrusion.

The paste extrudability of the fine powder of TFE polymer greatly depends on the conditions under which the fine powder of TFE polymer is produced. For example, when the extrudability of various TFE polymers is compared under constant extrusion conditions e.g. a constant velocity, a constant temperature, the same quantity of a lubricant, etc., the permissible upper limit of the reduction ratio (hereinafter referred to as "limit reduction ratio") of the powder of TFE polymer varies greatly from powder to powder with the conditions for the production of TFE polymer. When the powder is extruded at a reduction ratio over the limit reduction ratio of the powder, an undulating or helical extrudate is obtained, or cracks develop on the surface or in the interior of the extrudate due to a shearing force, and in an extreme case, the product breaks off during extrusion. Consequently a desired extrudate will not be available.

In view of the productivity, the extrusion pressure should not become too high, even if a high reduction ratio is attained. The limit reduction ratio of the fine powder of the TFE polymer and the extrusion pressure are affected by the extrusion velocity. The higher the extrusion velocity, the higher is the extrusion pressure and the lower is the required limit reduction ratio of the polymer.

With paste extrusion, it is further required that the extrudate after sintering gives a product having good mechanical properties. When the paste of the fine powder of TFE polymer is extruded through nozzles under a high reduction ratio, the TFE polymer particles are oriented in the direction of extrusion having undergone high shear stress. Consequently the molded product resulting from subsequent sintering has high tensile strength in the directions at right angles to the extrusion direction. However, molded products of which high mechanical strength is required or molded products such as pipes which are subjected to great internal pressure need to have improved strength in the directions at right angles to the extrusion direction.

It is also desired that the extrudate can be sintered with good dimensional stability. This is an essential requirement in the production of electric wire coating with TFE polymer.

These paste extrudabilities are almost entirely dependent on the properties of the TFE polymer used, namely on the conditions under which it is produced.

Although the fine powder of the homopolymer of TFE gives an extrudate which exhibits generally satisfactory mechanical strength after sintering, it remains to be improved in respect of productivity, i.e. in the limit reduction ratio of the polymer and extrusion pressure. For the improvement of these properties, it is known to modify the homopolymer of TFE as disclosed in U.S. Pat. No. 3,142,665 and British Pat. No. 1,253,598. According to U.S. Pat. No. 3,142,665, high molecular weight dispersion polymers consisting of at least 98% of TFE polymer have been proposed which can be extruded in the form of paste with a high reduction ratio and which are obtained by polymerizing TFE in the presence of so-called modifiers. In this method there are used as the modifier perfluoroalkyl- and perfluoroalkoxyethylene compounds that are capable of being polymerized under the polymerization conditions. But these polymers involve the problem that extrusion at a high velocity entails an increase in the extrusion pressure. Furthermore, the extrudates from the modified TFE polymers after sintering have low mechanical strength especially in directions at right angles to the extrusion direction, which is a serious drawback for the sintered product in the form of pipes or tubes.

The extrudate obtained from the moified TFE polymer of the U.S. Pat. No. 3,142,665 has poor dimensional stability on sintering, i.e. in the case of electric wire coating process, the inside diameter of the over layer of TFE polymer after sintering becomes larger than the wire diameter, and only illfitted coated wire is obtained.

British Pat. No. 1,253,598 discloses a process comprising the steps of preparing a dispersion having a solids content of from 5 to 15% by weight by copolymerization of TFE with ethylene halide, and then homopolymerizing TFE in a second vessel in the presence of the resulting polymer as a seed polymer to form 15 to 40 wt.% concentration of TFE polymer.

The polymer obtained by the process, however, is more excellent in limit reduction ratio than TFE homopolymer, and this polymer is still unsatisfactory, because it requires very high extrusion pressure to extrude this polymer at a high velocity and the extrusion at a high reduction ratio of about 1,000 or higher is not operable. The process has another disadvantage of giving a desired polymer in low yields.

An object of this invention is to provide a modified TFE polymer having high productivity and a process for producing the same. More specifically it is an object of this invention to provide a modified TFE polymer having a high limit reduction ratio and a process for producing the same, to provide a modified TFE polymer extrudable at low extrusion pressure and a process for producing the same and to provide a modified TFE polymer which is extrudable by low extrusion pressure even at a high extrusion velocity and a process for producing such TFE polymer.

Another object of this invention is to provide a modified TFE polymer for producing an extrudate capable of giving an article with high mechanical property after sintering and a process for producing the modified TFE polymer.

Another object of this invention is to provide a modified TFE polymer for preparing an extrudate which can be sintered with extremely small shrinkage and a process for producing such TFE polymer.

Still another object of this invention is to provide a process for producing a modified TFE polymer in high yields.

Other objects and features of this invention will become more apparent from the following description.

The modified TFE polymer of this invention is a polymer obtained by polymerizing tetrafluoroethylene with a copolymerizable modifier in an aqueous medium containing a polymerization initiator and a dispersant so that the resulting polymer contains 0.001 to 2 wt.% of the copolymerizable modifier based on the weight of the polymer, the polymer being characterized in that:

(1) chlorotrifluoroethylene is used as said copolymerizable modifier, (2) at least 50 wt.% of the copolymerizable modifier to be incorporated into the polymer is introduced into the polymerization system after 70 wt.% of the polymer to be finally formed has been formed, at least 50 wt.% of the copolymerizable modifier to be incorporated into the polymer thus being contained in the shell portion of the particles of the polymer, and (3) after 90 wt.% of the polymer to be finally formed has been formed, the concentration of said copolymerizable modifier is maintained at at least 0.01 mol.% based on the total amount of tetrafluoroethylene and the modifier in the polymerization system, the outermost portion of particles corresponding to at most 10 wt.% of the polymer to be finally obtained thus containing the copolymerizable modifier in an amount of at least 0.01 mol.%.

In the process according to this invention, an emulsion polymerization is carried out in the presence of a dispersant. The polymer is obtained as colloidal particles in an aqueous disperion, and the average particle size of the polymer usually ranges from about 0.2 to about 0.5μ. The fine powder of modified TFE polymer is obtained after coagulating the dispersion and drying the resulting solid.

Generally with the emulsion polymerization of TFE, the number of the particles of polymer neither increases nor decreases in the course of polymerization except in the early stage of polymerization in which nuclei of particles of the polymer are generating. In other words, after the early stage the polymerization proceeds only with increase in particle size but without changing the number of particles. It follows from this fact that at least 50 wt.% of the copolymerizable modifier incorporated in the polymer of this invention exists in the outer shell portions corresponding to at most 30 wt.% of the total weight of particles.

The TFE polymer obtained by the process of this invention contains 0.001 to 2 wt.%, preferably 0.01 to 1.0 wt.% of the modifier, based on the total weight of the polymer. When the modifier is the above-mentioned ω-hydroperfluoroolefin, the preferable amount of the modifier is 0.01 to 0.05 mol.%, based on the total weight of the polymer. Because the modifier is contained mainly in the shell portions of the particles, the modified TFE polymer of this invention ensures high productivity as is extrudable at a high reduction ratio and high velocity under relatively low pressure without accompanying any sacrifice of excellent physical or mechanical properties, especially outstanding resistance to heat and chemicals which homopolymer of TFE has, and gives molded articles having excellent mechanical strength.

The modified TFE polymer powder of this invention is not accompanied with the drawbacks in which the known powder with high reduction ratio tends to be difficult to form into continuous extrudate at low reduction ratio such as for example at the ratio of less than 100.

According to this invention, it is recommended that in the above mentioned process, the copolymerizable modifier is present in the polymerization system at a concentration of at least 0.01 mol.% based on the total amount of TFE and the modifier after 90 wt.% of the polymer to be finally formed has been formed. When the modifier is present in polymerization system as above, the molded product prepared from the resulting TFE polymer powder will have high mechanical strength after sintering, especially high tear strength in directions at right angles to the direction of extrusion.

Further according to this invention, in the above-mentioned processes the polymerizable modifier can be introduced into the polymerization system so that at least 0.001 wt.% of the modifier based on the weight of the polymer to be finally formed will be contained in the core portion corresponding to 30 wt.% of the polymer finally formed. This minimizes the shrinkage of the extrudate prepared from the resulting TFE polymer powder when the extrudate is sintered.

The content of the modifier in the TFE polymer obtained by the process of this invention can be determined by infrared absorption analysis. For example, when chlorotrifluoroethylene is used as the modifier, it can be determined from the absorption band at 957 $cm^{-1}$ due to C—Cl. Furthermore, the distribution of the modifier from the center to the outermost portion of the polymer particles can be confirmed, as will be described later, by the vapor-phase analysis in the course of polymerization for the production of the polymer or, alternatively, by sampling the polymer several times during the polymerization and measuring the modifier content of each sample by infrared absorption analysis.

The polymerization of TFE according to this invention is carried out in accordance with known general methods.

For polymerization, deionized water is placed into a reactor equipped with a temperature controlling device. Subsequently a dispersant and a polymerization initiator are charged into the reactor, the temperature is adjusted, TFE is fed until the pressure rise to a specified pressure, and the mixture is stirred, whereby the polymerization is initiated.

The polymerization temperature is suitably maintained at a temperature ranging from 0° to 100° C. The polymerization pressure is usually 1 to 100 kg/cm² G, preferably 3 to 50 kg/cm² G. The internal pressure of the reactor is maintained by the vapor of the TFE. Since the TFE is consumed with the progress of the reaction, and the pressure is lowered, then fresh TFE is fed under pressure into the reactor to maintain the specified pressure every time the internal pressure drops by a certain value (e.g. every 1 kg/cm² decrement) below the initial pressure. Accordingly the amount of the polymer formed can be calculated from the amount of each TFE charged (pressure difference) and the frequency of charging. It will then be easy to know the time to feed the modifier, if the amount of the polymer to be eventually formed and the time when the modifier should be introduced into the polymer are predetermined.

The modifier may be introduced into the polymerization system by some suitable methods. For example, a small vessel in which a required quantity of the modifier is enclosed may be provided at an intermediate location between TFE container and the reactor to which the modifier is fed at the same time when TFE is fed. The feed ratio of the modifier to the TFE is found out based on the polymerization reactivity ratio therebetween. For example when the modifier is chlorotrifluoroethylene which has substantially the same polymerization reactivity as TFE, the monomer composition in polymer particles may be regulated in such a manner as the monomer composition in the polymerization system is kept so as to be the same composition in the desired polymer particles. More specifically at least 50 wt.% of the chlorotrifluoroethylene to be incorporated into the polymer is introduced into the polymerization system after, preferably immediately after, 70 wt.% of the TFE to be finally formed has been polymerized. Since chlorotrifluoroethylene is highly reactive, a major portion of the chlorotrifluoroethylene which is fed into the polymerization system immediately after 70% of the polymerization has proceeded, is incorporated into the formed polymer. After 90 wt.% of the polymer to be finally formed has been formed, the concentration of said copolymerizable modifier is maintained at at least 0.01 mol.% based on the total amount of TFE and the modifier in the polymerization system, and the outermost portion of particles corresponding to at most 10 wt.% of the polymer to be finally obtained contains the copolymerizable modifier in an amount of at least 0.01 mol.%.

Further when at least 0.001 wt.% of the copolymerizable modifier based on the weight of the polymer finally formed is introduced into the polymerization system before 30 wt.% of the polymer to be finally formed has been formed, at least 0.001 wt.% of the copolymerizable modifier based on the weight of the polymer finally formed is contained in the core portion of the particles of the polymer.

When the modifier is introduced into the polymerization system in the middle of the polymerization, the polymerization velocity markedly decreases immediately thereafter, with the result that the reaction takes a prolonged period of time. However, great influence on the overall polymerization time can be avoided by delaying the introduction of the modifier to the greatest possible extent or by minimizing the required amount of the modifier.

Examples of the compounds represented by the formula $CF_2=CF(CF_2CF_2)_nH$ selected in this invention as copolymerizable modifiers are $CF_2=CFCF_2CF_2H$, $CF_2=CF(CF_2CF_2)_2H$, $CF_2=CF(CF_2CF_2)_3H$, $CF_2=CF(CF_2CF_2)_4H$ and $CF_2=CF(CF_2CF_2)_5H$, among which $CF_2=CFCF_2CF_2H$ and $CF_2=CF(CF_2CF_2)_2H$ are preferable.

Polymerization initiators useful in this invention are ammonium persulfate, potassium persulfate, sodium bisulfite, disuccinic acid peroxide and various other known initiators. They can be used alone or in admixture of more than two thereof. The polymerization can be initiated also by ionizing radiations.

Suitable as dispersants are anionic surfactants, among which compounds of the polyfluoroalkyl type are preferable. Examples are alkali metal salts, ammonium salt, etc. of perfluorooctanoic acid, ω-hydroperfluorononanoic acid or the like. The amount of such dispersant is usually used in an amount ranging 0.01 to 10 wt.%, perferably 0.05 to 5 wt.%, based on aqueous medium. According to this invention, it is preferable to use a dispersion stabilizer conjointly with the dispersant in order to improve the dispersion stability of the resulting polymer. Typical compounds of such stabilizers are saturated hydrocarbons having at least 12 carbon atoms. However, when the polymerization reaction is conducted with an ionizing radiation, it is suitable to add saturated hydrocarbon to the polymerization system which is liquid under the polymerization condition to prevent the formation of nondispersible polymer, by-product, in the vapor phase and also to increase the polymerization reaction velocity.

The polymerization reaction is terminated after the concentration of the polymer in the aqueous medium has reached 25 to 40 wt.%. If the concentration of polymer becomes higher than this range, coagulation occurs and a polymer of uniform quality will not be available. After completion of the polymerization, the monomers, chiefly TFE, are purged off from the reactor, and the reactor is cooled, whereby an aqueous dispersion of modified TFE polymer is obtained. When suitably diluted with water, coagulated and dried, the dispersion gives a fine powder of TFE polymer. During or after the coagulating step, the polymer may be granulated by a known method to obtain a product which is convenient to handle.

This invention will be described below more specifically with reference to examples, in which parts and percentages are by weight and the paste extrusion performance of the polymer is determined by the following method. The polymer powder (83 parts by weight) is thoroughly admixed with 17 parts by weight of a hydrocarbon lubricant, "Isopar-E" (trade mark of Esso Standard Petroleum Co., Ltd., bp: about 125° C.), consisting predominantly of isoparaffin. The mixture is placed into a cylinder, 31.8 mm in inside diameter, equipped with a die at its lower end. The die has a reduction angle of 30° and is provided at the lower end with an orifice, 0.8 mm in inside diameter and 7 mm in land length. The mixture is then extruded from the orifice by a ram descending at a velocity of 50 mm/min. while automatically recording the extrusion pressure on paper. At first the extrusion pressure rapidly increases to a maximum value and then gradually decreases to a constant value in several minutes. The constant value is measured as the extrusion pressure for the powder. The die has a reduction ratio of 1,600. The powder can be tested at varying reduction ratios by using different dies. In the examples given later, for example, the extrusion tests are conducted by this method at reduction ratios of 36 and 910.

EXAMPLE 1

(Run Nos. 1 to 9)

A 15 l quantity of deionized deoxidized water and 750 g of paraffin wax are placed into an autoclave having a water capacity of 40 l and equipped with a stirrer and a temperature-controlling jacket fitted therearound. Ammonium perfluorooctanoate serving as a dispersant and disuccinic acid peroxide (hereinafter referred to as "DSP") serving as a polymerization initiator are also charged into the autoclave in the amounts listed in Table 1. The interior atmosphere of the autoclave is replaced by nitrogen gas several times while controlling the temperature to the value listed in Table 1. Subsequently TFE is fed into the autoclave until the internal pressure reaches 8.0 kg/cm$^2$ G. At the same time chlorotrifluoroethylene (hereinafter referred to as "CTFE") is charged in the amount given in Table 1. One hour after the addition of the DSP, ammonium persulfate (hereinafter referred to as "APS") is added in the amount listed in Table 1 to the mixture while stirring the mixture. The addition of the APS substantially initiates polymerization, and the pressure starts to decrease. When the internal pressure drops to 7.0 kg/cm$^2$ G, TFE is fed into the autoclave until the pressure rises to 8.0 kg/cm$^2$ G. In this way, the reaction system is pressurized repeatedly when a pressure drop is observed. CTFE is added in the amounts listed in Table 1 to the system when the system is repressurized by TFE 50th time (only for two runs) and 61st time. The times when the CTFE is intermediately added correspond to the times when about 70 wt.% and about 85 wt.% of polymer has been formed based on the amount of the polymer to be finally formed.

The polymerization reaction is terminated when the pressure decreases after the system is repressurized 71st time. When the gas within the autoclave is checked by gas chromatography upon termination of the polymerization, CTFE is detected in a sufficient amount in excess of 0.01 mol.%.

The same procedure as above is repeated as referred to by Run Nos. 1 to 9 to obtain TFE polymer dispersions having concentrations given in Table 2. The average particle sizes of the polymers in the dispersions are measured with the results given also in Table 2.

Each of the dispersions in coagulated, washed and dried to obtain a powder, which is subjected to infrared analysis to determine the CTFE content of the polymer, with the result shown in Table 2.

The powder is tested for paste extrusion performance at reduction ratios of 36, 910 and 1600. The results are given in Table 2. Furthermore the extrudates obtained at a stable constant extrusion pressure are checked for the appearance. The results evaluated according to the following criteria are listed also in Table 2.

A: Smooth-surfaced extrudate free of undulation.
B: Extrudable with slight undulation.
C: Fractured or markedly undulating extrudate.

Table 2 reveals that all the polymers prepared by the foregoing method have satisfactory paste extrusion performance in that they are extrudable at moderate pressures, giving products of uniform properties.

COMPARISON EXAMPLE 1

(Run Nos. 10 to 14)

Under the same conditions as in Example 1, TFE is subjected to emulsion polymerization without using any modifier (Rund No. 10), or using the modifier but permitting the modifier to be incorporated into the outermost portion of the particles in a much lower proportion that is specified by the present invention (Run No. 11 and No. 12), or causing the modifier to be incorporated into only the core portions of the particles and not in the shell portion (Run No. 13), or using hexafluoropropylene (HFP) as a modifier in place of CTFE (Run No. 14).

The polymerization reaction is conducted substantially under the same conditions as in Example 1 except for those given in Table 3. In Run No. 12, the residual gas within the autoclave after termination of polymerization is found to contain 0.001 mol.% of CTFE. For Run. No. 14, hexafluoropropylene is used as a modifier according to the method described in U.S. Pat. No. 3,142,665.

Table 4 shows the paste extrusion performance of the resulting polymers, indicating that they require high extrusion pressures. With Run Nos. 10 to 12, discontinuous extrudates are obtained at a reduction ratio of 1600 with very unstable, greatly varying extrusion pressures. The powder of Run No. 14, although extrudable at all the listed reduction ratios, requires high extrusion pressure, and the extrudate obtained at a reduction ratio of 36 has low strength and is prone to fracture and inferior in handleability.

COMPARISON EXAMPLE 2

(Run Nos. 15 to 17)

TFE is polymerized under the conditions shown in Table 5 in the same manner as in Example 1 except that a 1.5-l glass reactor containing 750 ml of water is used and that with Run No. 15 TFE is charged into the reactor only 24 times. The resulting polymer has smaller particle sizes than those of the previous example as indicated in Table 6.

For Run Nos. 16 and 17, an aqueous dispersion containing 25 g of the modified TFE polymer obtained in Run No. 15 is placed into the same reactor as above. TFE is charged into the reactor 46 times, and polymerization is conducted under the conditions given in Table 5 in the same manner as in Run No. 15.

The polymers obtained in Run Nos. 16 and 17 are tested for extrusion performance with the results given in Table 6.

Table 1

| | Polymerization conditions | | | | | | | |
|---|---|---|---|---|---|---|---|---|
| | Polymerization initiator | | | | | Amount of modifier used | | |
| Example Run No. | DSP (g) | APS (g) | Temp. (°C) | Dispersant (g) | Modifier | Initial (mol) | Intermediate Time (%) | Amount (mol) |
| 1 | 1.50 | 0.15 | 85 | 23 | CTFE | 0.010 | 85 | 0.100 |

Table 1-continued

| | Polymerization conditions | | | | | | | |
|---|---|---|---|---|---|---|---|---|
| | Polymerization initiator | | | | | | Amount of modifier used | |
| Example Run No. | DSP (g) | APS (g) | Temp. (°C) | Dispersant (g) | Modifier | Initial (mol) | Intermediate Time (%) | Amount (mol) |
| 2 | 1.50 | 0.15 | 85 | 23 | CTFE | 0 | 85 | 0.100 |
| 3 | 1.50 | 0.15 | 85 | 23 | CTFE | 0.010 | 70 | 0.050 |
| | | | | | | | 80 | 0.050 |
| 4 | 1.00 | 0.10 | 85 | 23 | CTFE | 0.020 | 85 | 0.200 |
| 5 | 1.00 | 0.10 | 85 | 25 | CTFE | 0.100 | 85 | 1.000 |
| 6 | 1.50 | 0.15 | 85 | 23 | CTFE | 0.050 | 85 | 0.500 |
| 7 | 1.50 | 0.15 | 83 | 23 | CTFE | 0 | 85 | 0.500 |
| 8 | 1.50 | 0.15 | 83 | 23 | CTFE | 0.050 | 70 | 0.250 |
| | | | | | | | 85 | 0.250 |
| 9 | 1.50 | 0.15 | 87 | 23 | CTFE | 0.050 | 85 | 0.050 |

Table 2

| | Product | | | Paste extrusion performance | | | |
|---|---|---|---|---|---|---|---|
| | | Average | Modifier | Extrusion pressure (kg/cm$^2$) | | | Appearance |
| Example Run No. | Concn. (%) | particle size (μ) | content (wt.%) | Reduction ratio 36 | Reduction ratio 910 | Reduction ratio 1600 | of extrudate |
| 1 | 31.7 | 0.260 | 0.17 | 18.7 | 400 | 560 | A |
| 2 | 33.0 | 0.290 | 0.15 | 17.8 | 380 | 530 | A |
| 3 | 31.1 | 0.261 | 0.18 | 18.4 | 410 | 567 | A |
| 4 | 33.0 | 0.240 | 0.33 | 17.0 | 380 | 510 | A |
| 5 | 31.0 | 0.205 | 1.71 | — | 345 | 500 | B |
| 6 | 31.0 | 0.225 | 0.85 | — | 360 | 505 | A |
| 7 | 31.0 | 0.288 | 0.77 | — | 330 | 480 | B |
| 8 | 31.0 | 0.230 | 0.86 | — | 365 | 500 | A |
| 9 | 32.0 | 0.246 | 0.08 | 17.4 | 460 | 650 | A |

Table 3

| | Polymerization conditions | | | | | | | |
|---|---|---|---|---|---|---|---|---|
| | Polymerization Initiator | | | | | Amount of modifier used | | |
| Comp. Ex. Run No. | DSP (g) | APS (g) | Temp. (°C) | Dispersant (g) | Modifier | Initial (mol) | Intermediate Time (%) | Amount (mol) |
| 10 | 1.0 | 0.1 | 85 | 23 | — | 0 | — | 0 |
| 11 | 1.5 | 0.15 | 85 | 23 | CTFE | 0 | 85 | 0.003 |
| 12 | 1.5 | 0.15 | 85 | 23 | CTFE | 0.010 | 60 | 0.1 |
| 13 | 1.5 | 0.15 | 85 | 22 | CTFE | 0.100 | — | 0 |
| 14 | 1.5 | 0.15 | 85 | 23 | HFP | 0.010 | 62 | 0.170 |

Table 4

| | Product | | | Paste extrusion performance | | | |
|---|---|---|---|---|---|---|---|
| | | Average | Modifier | Extrusion pressure (kg/cm$^2$) | | | Appearance |
| Comp. Ex. Run No. | Concn. (%) | particle size(μ) | content (wt. %) | Reduction ratio 36 | Reduction ratio 910 | Reduction ratio 1600 | of extrudate |
| 10 | 32.6 | 0.290 | 0 | 20.9 | 905 | Fractured | C |
| 11 | 31.0 | 0.290 | 0.005 | — | 800 | Fractured | C |
| 12 | 30.8 | 0.240 | 0.170 | 21.2 | 710 | Fractured | C |
| 13 | 31.3 | 0.208 | 0.170 | 26.7 | 850 | Fractured | C |
| 14 | 30.0 | 0.195 | 0.104 | 25.1 | 588 | 780 | A |

Table 5

| | Polymerization conditions | | | | | | | |
|---|---|---|---|---|---|---|---|---|
| | Polymerization initiator | | | | | Amount of modifier used | | |
| Comp. Ex. Run No. | DSP (g) | APS (9) | Temp. (°C) | Dispersant (g) | Modifier | Initial (mol) | Intermediate Time (%) | Amount (mol) |
| 15 | 0 | 0.10 | 85 | 1.5 | CTFE | 0.046 | — | 0 |
| 16 | 0 | 0.05 | 85 | 1.5 | — | 0 | — | 0 |
| 17 | 0 | 0.05 | 85 | 1.5 | — | 0 | — | 0 |

Table 6

| | Product | | | Paste extrusion performance | | | |
|---|---|---|---|---|---|---|---|
| | | Average | Modifier | Extrusion pressure (kg/cm$^2$) | | | Appearance |
| Comp. Ex. Run No. | Concn. (%) | particle size (μ) | content (wt. %) | Reduction ratio 36 | Reduction ratio 910 | Reduction ratio 1600 | of extrudate |
| 15 | 11.2 | 0.100 | 4.00 | — | — | — | — |
| 16 | 21.4 | 0.312 | 0.51 | 20.5 | 819 | Fractured | C |
| 17 | 22.0 | 0.400 | 0.47 | — | — | Fractured | C |

EXPERIMENT 1

The powders of the polymers prepared in Example Run No. 4 and Comparison Example Run Nos. 10 to 14 are extruded into pipes under the following conditions, and the molded products obtained are tested for tear strength.

The polymer powder is admixed with 17 wt. parts of "Isopar-E" (Trade mark of Esso Standard Oil Co., Ltd.; hydrocarbon lubricant), and the mixture obtained is extruded at a ram speed of 40 mm/min and at a reduction ratio of 274 into a pipe, 6 mm in inside diameter and 8 mm in outside diameter. The extrudate is continuously sintered at 380° C. in a furnace connected to the extruder to obtain a finished pipe.

A 700-mm length of the pipe is cut off, one end of the pipe is cut into two in the longitudinal direction, and the cut end portions are clamped to the clamps of a tension tester and pulled apart at a velocity of 200 mm/min to measure the tear strength of the pipe. The result is shown in Table 7.

Table 7

| Polymer | Tear strength (kg/cm$^2$) |
|---|---|
| Example Run No. 4 | 4.0 |
| Comp. Ex. Run No. 10 | 3.2 |
| Comp. Ex. Run No. 14 | 3.1 |

EXAMPLE 2

(Run Nos. 18 to 20)

A 15 l quantity of deionized deoxidized water, 750 g of paraffin wax serving as a dispersion stabilizer and 22 g of ammonium perfluorooctanoate serving as a dispersant are placed into an autoclave having a water capacity of 40 l and equipped with a stirrer and a temperature-controlling jacket fitted therearound. The interior atmosphere of the autoclave is replaced by nitrogen gas several times while controlling the temperature to 85° C. TFE is fed into the autoclave until the internal pressure reaches 8.0 kg/cm$^2$ G. While maintaining the temperature at 85° C. with stirring, 1.5 g of DSP and 0.1 g of APS are added to the mixture to initiate polymerization. When the internal pressure drops to 7.0 kg/cm$^2$ G, TFE is fed into the autoclave until the pressure rises to 8.0 kg/cm$^2$ G. In this way, the reaction system is pressurized repeatedly when a pressure drop is observed. When the system is repressurized 54th time, 0.2 mols of hexafluoropropylene (hereinafter referred to as "HFP") is added. The time when the HFP is thus intermediately added corresponds to the time when about 72 wt.% of polymer has been formed based on the total amount of the polymer to be finally formed. The polymerization is terminated after the system has been repressurized 75 times. The quantity of the residual HFP gas in the autoclave is determined by gas chromatography, and the HFP content of the resulting polymer is calculated from the difference between the value determined and the quantity of HFP added. The calculated value of HFP contents coincides with the value directly determined by the infrared analysis of the polymer. The concentration of the polymer emulsion is calculated based on the specific gravity thereof.

Subsequently the emulsion is coagulated, washed and dried to obtain a powder, which is tested for paste extrusion performance at reduction ratios of 910 to 1600.

The same procedure as above is repeated except that the amounts of polymerization initiator and dispersant, polymerization temperature, the kind and amount of modifier, and the time to charge the modifier are varied as listed in Table 8. Table 9 shows the properties and paste extrusion performance of the polymers obtained. The modifier used for Run No. 20 is ω-hydroperfluorobutene, which is indicated as "ω-HB" in Table 8.

Table 9 reveals that the modified TFE polymers are extrudable at reduction ratios of 910 and 1600 under relatively low extrusion pressures, giving satisfactory molded products. The low extrusion pressure means that the proportion of the amount of the lubricant (Isopar-E) to polymer is reducible.

COMPARISON EXAMPLE 3

(Run Nos. 21 to 22)

Modified TFE polymers are prepared using the same reactor as in Example 2 under the same conditions as in Example 2 except for the conditions listed in Table 8. More specifically, for Comparison Example Run No. 21, the same amount of the modifier as used for Example Run No. 18 is placed into the system at the start of polymerization without thereafter adding any modifier. For Comparison Example Run No. 22, the same amount of the modifier as used for Example Run No. 19 is added to the system after 60 wt.% of TFE to be polymerized has been polymerized, instead of adding the modifier at the start of the reaction.

The paste extrusion performance of the polymers obtained in listed in Table 9, which shows that they require high extrusion pressures and give extrudates which have a poor appearance.

Table 8

| | Polymerization conditions | | | | | | | |
|---|---|---|---|---|---|---|---|---|
| | Polymerization initiator | | | | | Amount of modifier used | | |
| | | | | | | Initial | Intermediate | |
| | DSP (g) | APS (g) | Temp. (° C) | Dispersant (g) | Modifier | (mol) | Time (%) | Amount (mol) |
| Example Run No. | | | | | | | | |
| 18 | 1.5 | 0.1 | 22 | 85 | HFP | 0 | 72 | 0.20 |
| 19 | 4.0 | 0.4 | 20 | 90 | HFP | 0 | 80 | 0.04 |
| 20 | 1.0 | 0.1 | 22 | 85 | ω-HB | 0 | 90 | 0.10 |
| Comp. Ex. Run No. | | | | | | | | |
| 21 | 1.5 | 0.1 | 22 | 85 | HFP | 0.2 | — | — |
| 22 | 4.0 | 0.4 | 20 | 88 | HFP | 0 | 60 | 0.04 |

Table 9

| | Product | | | Paste extrusion performance | | |
|---|---|---|---|---|---|---|
| | Concn. (%) | Average particle size (μ) | Modifier content (wt. %) | Extrusion pressure (kg/cm$^2$) | | Appearance of extrudate |
| | | | | Reduction ratio 910 | Reduction ratio 1600 | |
| Example Run. No. | | | | | | |
| 18 | 33.5 | 0.281 | 0.115 | 320 | 451 | A |
| 19 | 33.2 | 0.286 | 0.007 | 410 | 400 | A |
| 20 | 33.0 | 0.225 | 0.01* | 365 | 504 | A |
| Comp. Ex. Run No. | | | | | | |
| 21 | 34.0 | 0.170 | 0.198 | At least 1000 | Not extrudable | C |
| 22 | 33.2 | 0.292 | 0.007 | 520 | 590 | B |

*Determined by the gas chromatographic analysis of the gas in the autoclave. The other values for the modifier content are directly determined by infrared analysis of the polymer.

EXAMPLE 3

(Run Nos. 23 and 24)

Run No. 23

A 15 l quantity of deionized deoxidized water, 750 g of paraffin wax serving as a dispersion stabilizer and 22 g of ammonium perfluorooctanoate serving as a dispersant are placed into an autoclave having a water capacity of 40 l and equipped with a stirrer and a temperature-controlling jacket fitted therearound. The interior atmosphere of the autoclave is replaced by nitrogen gas several times while controlling the temperature. Finally TFE is fed into the autoclave until the internal pressure reaches 8.0 kg/cm$^2$ G, and the temperature is adjusted to 85° C. Simultaneously with the introduction of TFE, 0.013 mol. of HFP is admitted to the autoclave.

While maintaining the temperature always at 85° C. with stirring, 1.5 g of DSP and 0.1 g of APS as polymerization initiators are added to the mixture to initiate polymerization. When the internal pressure drops to 7.0 kg/cm$^2$ G, TFE is again fed into the autoclave until the pressure rises to 8.0 kg/cm$^2$ G. In this way, the reaction system is pressurized repeatedly when a pressure drop takes place. When the system is repressurized 54th time, HFP is added in the amount listed in Table 10 to the system. The time when the HFP is thus intermediately added corresponds to the time when about 72 wt.% of polymer has been formed based on the amount of the polymer to be finally formed.

The polymerization is terminated after the system has been repressurized 75 times, whereupon the quantity of the residual HFP gas in the autoclave is determined by gas chromatography, and the HFP content of the resulting polymer is calculated from the difference between the value determined and the quantity of HFP added. The calculated value coincides with the value directly determined by the infrared analysis of the polymer. The concentration of the polymer emulsion is calculated based on the specific gravity tehreof. To determine the average particle size of the polymer obtained, the turbidity of the emulsion is measured by turbidity-meter which utilizes the principle of scattering of light. The particle size is calculated from an equation showing the relation between turbidity and particle size which has been previously obtained from electron microscopical observation.

Table 10 shows the conditions of the polymerization reaction, Table 11 the properties of the polymer, and Table 12 the paste extrusion performance and tube molding perfomance of the polymer. The tube molding performance is tested according to the method mentioned later. Table 11 also shows the modifier content of the polymer obtained by sampling the polymer when the system is repressurized 23rd time (corresponding to the time when about 29% of polymerization has been complted).

Run No. 24

The same procedure as above is repeated under the condition specified in Table 10 to prepare a modified TFE polymer except that ω-HB is used in place of HFR. Table 11 shows the properties of the polymer obtained, and Table 12 the paste extrusion performance and tube molding performance of the polymer.

Tables 11 and 12 indicate that the polymers obtained are satisfactory in both paste extrusion performance and tube molding performance.

COMPARISON EXAMPLE 4

(Run Nos. 25 and 26)

Modified TFE polymers are prepared using the same reactor as in Example 3 under the same conditions as in Example 3 except for the conditions listed in Table 10. More specifically, for Comparison Example Run No. 25, the same amount of the modifier as used for Example Run No. b 23 is added to the system when 72 wt.% of TFE to be polymerized has been polymerized, without using any modifier at the start of the reaction. For Comparison Example Run No. 26, 0.2 mol. of HFP is placed into the system at the start of polymerization without thereafter adding any modifier.

Tables 11 and 12 show the paste extrusion performance and tube molding performance of the polymers obtained. The tube molding performance is tested by the same method as in Example 3. It is seen that the reaction system to which the modifier is not added at the start of the reaction gives a polymer which is satisfactory in paste extrusion performance but poor in tube molding performance. Further a process in which the modifier is incorporated from the start of the reaction without thereafter adding gives a polymer with very inferior paste extrusion performance, failing to give a continuous tube due to fracture during extrusion.

The tube molding performance of the polymers are tested by the following method.

83 Parts by weight of polymer powder is admixed with 17 parts by weight of lubricant, and the mixture is charged into an extrusion cylinder equipped with a die for extruding a tube 2.5 mm in outside diameter and 1.5 mm in inside diameter at a reduction ratio of 910. As in the extrusion performance test, the piston is operated to extrude a tube while automatically recording the extrusion pressure on paper. For 3 minutes, the extrudate is passed through an electric oven at 380° C. free of any load, and the baked tube is then allowed to cool in air.

The inside diameter and shrinkage of the tube in the direction of extrusion are measured.

Table 10

| | Polymerization conditions | | | | | | Amount of modifier used | | |
|---|---|---|---|---|---|---|---|---|---|
| | Polymerization Initiator | | | | | | | Intermediate | |
| | DSP (g) | ASP (g) | Temp. (°C) | Pressure (kg/cm²G) | Dispersant (g) | Modifier | Initial (mol) | Time (%) | Amount (mol) |
| Example Run No. | | | | | | | | | |
| 23 | 1.5 | 0.1 | 85 | 8.0 | 22 | HFP | 0.013 | 72 | 0.190 |
| 24 | 1.0 | 0.1 | 85 | 8.0 | 22 | ω-HB | 0.005 | 90 | 0.100 |
| Comp. Ex. Run No. | | | | | | | | | |
| 25 | 1.5 | 0.1 | 85 | 8.0 | 22 | HFP | 0 | 72 | 0.190 |
| 26 | 1.5 | 0.1 | 85 | 8.0 | 22 | HFP | 0.200 | — | 0 |

Table 11

| | Product | | | |
|---|---|---|---|---|
| | Concn. (%) | Average particle size (μ) | Modifier content of entire polymer (wt. %) | Modifier content of polymer at 29% polymerization* (wt. %) |
| Example Run No. | | | | |
| 23 | 34.0 | 0.230 | 0.112 | 0.004 |
| 24 | 33.0 | 0.225 | 0.010 | 0.001 |
| Comp. Ex. Run No. | | | | |
| 25 | 34.1 | 0.270 | 0.101 | 0 |
| 26 | 34.0 | 0.170 | 0.198 | 0.075 |

*The modifier content of the polymer obtained when 29 wt. % of the polymer to be finally formed has been formed.

Table 12

| | Paste extrusion performance | | Tube molding performance | | |
|---|---|---|---|---|---|
| | Extrusion pressure (kg/cm²) | | | Finished inside diameter (mm) | Shrinkage in extrusion direction (%) |
| | Reduction ratio 910 (tube extrusion) | Reduction ratio 1600 (bar extrusion) | Appearance of extrude | | |
| Example Run No. | | | | | |
| 23 | 570 | 485 | Good | 1.47 | 23.1 |
| 24 | 600 | 504 | Good | 1.50 | 25.5 |
| Comp. Ex. Run No. | | | | | |
| 25 | 520 | 420 | Good | 1.54 | 30.1 |
| 26 | At least 1000 | At least 1000 | Poor (fractured) | —* | —* |

*The extrudate is fractured, failing to give a continuous tube.

EXPERIMENT 2

The powders of the polymers prepared in Example Run Nos. 2 and 4, and Comparison Example Run Nos. 10, 11 and 12 are extruded into pipes under the following conditions.

Each of the polymer powders is admixed with 17 wt. parts of "Isopar-E", and the mixture is extruded at a ram speed 40 mm/min and at a reduction ratio of 274 into a pipe, 6 mm in inside diameter and 8 mm in outside diameter. The extrudate is continuously sintered at 380° C. in a furnace connected to the extruder to obtain a finished pipe.

The finished pipe is subjected to the bending-wear test described below. The result is shown in Table 13.

Bending-wear Test

A bending-wear tester is used which is composed of a steam pipe and an air cylinder having a reciprocating piston rod.

One end of the sample pipe is connected to the steam pipe and another is connected to the piston rod of air cylinder, the former end being fixed at the stationary position and the latter end being moved with reciprocating motion of the piston rod to give repeated bending stress to the sample pipe.

While introducing steam of 7 kg/cm² G pressure into the sample pipe from its one end connected to the steam pipe, repeated bending stress is given to the sample pipe as described above. The frequency of reciprocating motion is 25 times/min, and the stroke of piston is 300 mm. The sample pipe is bended to an angle of about 90° C. when subjected to a highest stress during the testing.

Thus the bending motion is repeated until steam begins to leak out of a crack which is formed at the depressed part of the sample pipe due to the application of high bending stress. The bending-wear resistance is determined in terms of frequency of bending which has been given to the sample until steam begins to leak out therefrom.

Table 13

| Polymer | Frequency of bending |
|---|---|
| Example Run No. 2 | 15 – 18 |
| Example Run No. 4 | 17 – 20 |
| Comp. Ex. Run No. 10 | 2.5 – 4 |
| Comp. Ex. Run No. 11 | 7 – 10 |
| Comp. Ex. Run No. 12 | 9 – 11 |
| Comp. Ex. Run No. 13 | 6 – 7 |
| Comp. Ex. Run No. 14 | 8 – 10 |

The results show that the sample pipes prepared from the polymer of the present invention (Run Nos. 2 and 4) have markedly higher bending-wear resistance than those prepared from the polymers of the Comparison Example (Run Nos. 10–14). The polymers (Run Nos. 10–14) are prepared by emulsion polymerization under the same conditions as in the polymer of Run No. 2, with exceptions the CTFE is not used in the polymerization (Run No. 10), or CTFE is incorporated into the outermost portion of the particles in a much lower proportion than is specified by the present invention (Run Nos. 11 and 12), or CTFE is caused to be incorporated into only the cores of the particles and not in the shells (Run No. 13), or hexafluoropropylene (HFP) is used as a modifier in place of CTFE (Run No. 14).

What we claim is:

1. In a process for polymerization of tetrafluoroethylene with a copolymerizable modifier in an aqueous medium containing a polymerization initiator and a dispersant to produce a modified tetrafluoroethylene polymer containing 0.001 to 2 wt.% of the copolymerizable modifier based on the weight of the polymer, a process for producing the modifier tetrafluoroethylene polymer characterized in that:
   (1) chlorotrifluoroethylene is used as said copolymerizable modifier,
   (2) at least 50 wt.% of the copolymerizable modifier to be incorporated into the polymer is introduced into the polymerization system after 70 wt.% of the polymer to be finally formed has been formed, at least 50 wt.% of the copolymerizable modifier to be incorporated into the polymer thus being contained in the shell portion of the particles of the polymer, and
   (3) after 90 wt.% of the polymer to be finally formed has been formed, the concentration of said copolymerizable modifier is maintained at at least 0.01 mol.% based on the total amount of tetrafluoroethylene and the modifier in the polymerization system, the outer most portion of particles, corresponding to at most 10 wt.% of the polymer to be finally obtained, thus containing the copolymerizable modifier in an amount of at least 0.01 mol.%.

2. A modified tetrafluoroethylene polymer produced by the process claimed in claim 1.

* * * * *